Aug. 13, 1957  W. F. HOAGLAND ET AL  2,802,431
PASTRY CUTTING MACHINE
Filed Dec. 7, 1953  2 Sheets-Sheet 1
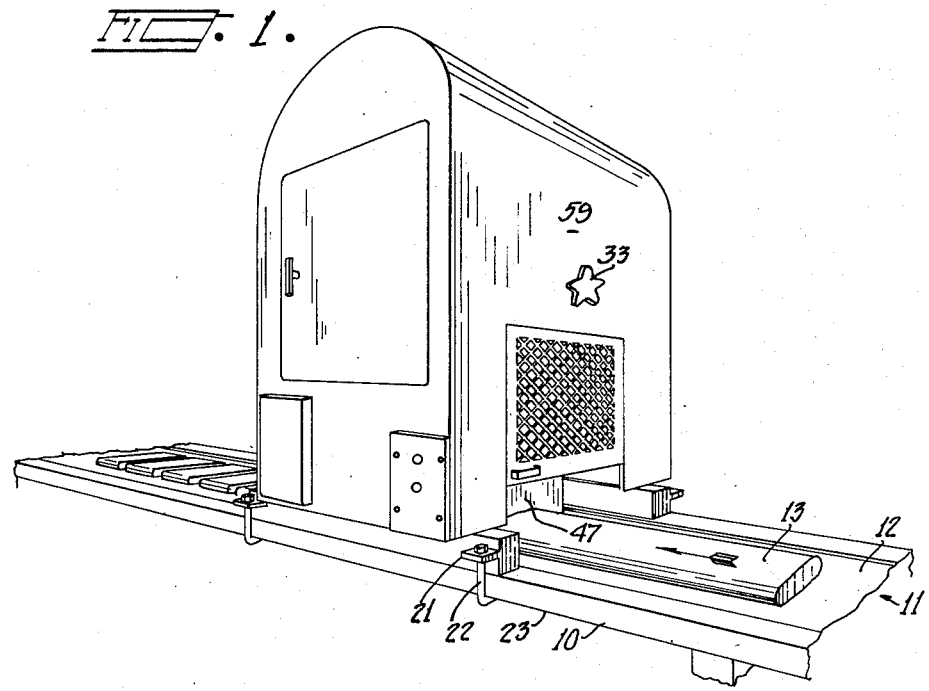
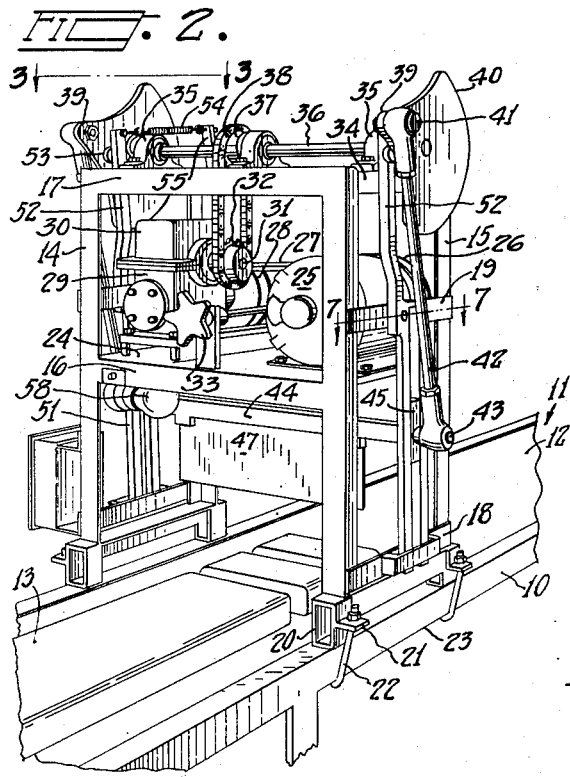
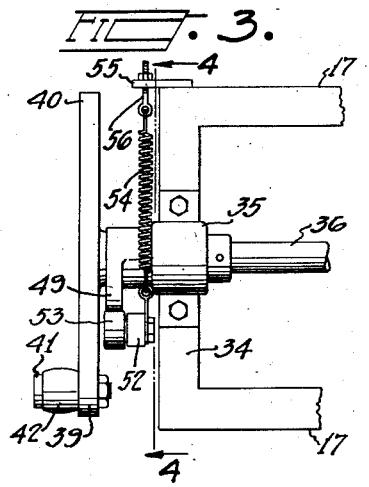
INVENTORS
RAYMOND E. DOTY
WILLIAM F. HOAGLAND
ATTORNEY Aug. 13, 1957  W. F. HOAGLAND ET AL  2,802,431
PASTRY CUTTING MACHINE
Filed Dec. 7, 1953 2 Sheets-Sheet 2
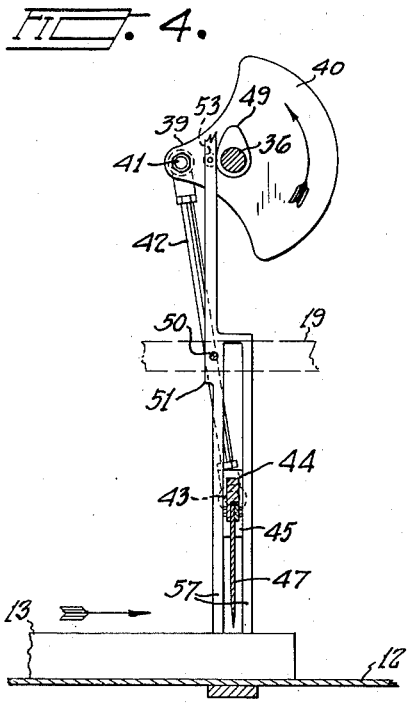
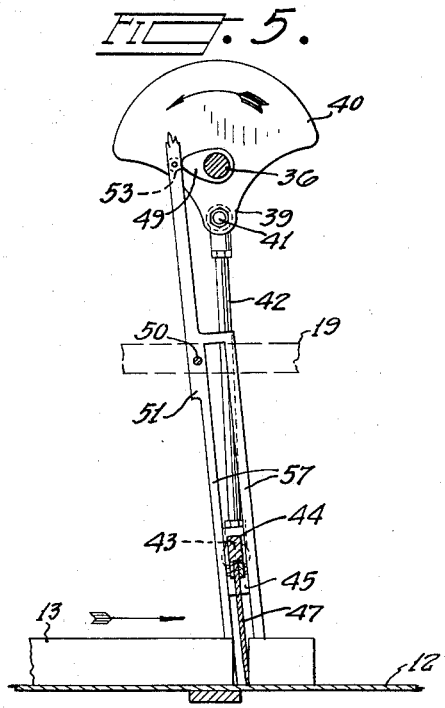
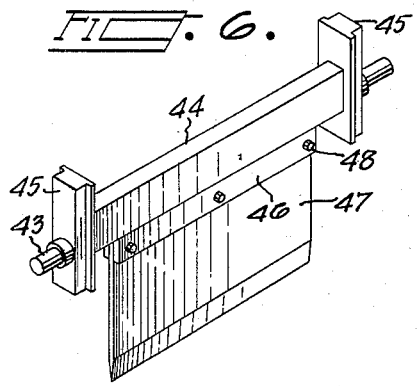
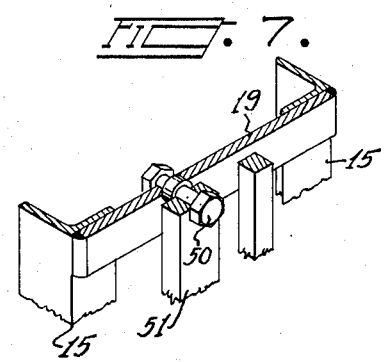
INVENTORS
RAYMOND E. DOTY
WILLIAM F. HOAGLAND
BY
ATTORNEY United States Patent Office 2,802,431
Patented Aug. 13, 1957

2,802,431

PASTRY CUTTING MACHINE

William Fred Hoagland, Klamath Falls, and Raymond E. Doty, Medford, Oreg.

Application December 7, 1953, Serial No. 396,533

1 Claim. (Cl. 107—21)

This invention relates generally to the bakers' art and particularly to a pastry cutting machine.

The main object of this invention is to provide a relatively simple and efficient form of pastry cutting machine by means of which it would be possible for a baker to selectively and accurately control the weight of each slice of dough coming from the machine.

The second object is to produce a machine of this type in which there will be no danger of sticking and thereby interfering with the operation of the machine when the moisture content of the dough varies from a desired value.

The third object of this invention is to provide a machine in which the parts are readily accessible for cleaning and adjustment.

We accomplish these and other objects in the manner set forth in the following specification as illustrated in the accompanying drawings, in which Fig. 1 is a perspective view of a machine embodying our invention.

Fig. 2 is a perspective view of the machine with its cover removed.

Fig. 3 is a fragmentary plan view as viewed from the line 3—3 in Fig. 2.

Fig. 4 is a section taken along the line 4—4 in Fig. 3, showing a raised position of the blade.

Fig. 5 is similar to Fig. 4 but showing the knife at its lowermost position.

Fig. 6 is a perspective detail of the knife and carrier.

Fig. 7 is a perspective section taken along the line 7—7 in Fig. 2.

Like numbers of reference refer to the same or similar parts throughout the several views.

Referring in detail to the drawings there are shown the side frames 10 of a conveyor table 11 upon which ordinarily travels a conveyor belt 12 upon which rides a strip of dough 13. It is the purpose of this machine to cut this strip of dough 13 into a series of dough blocks of uniform size and weight.

Referring particularly to the device itself, it will be seen to include the upright frame members 14 and 15 having the transverse horizontal cross ties 16 and 17 and the longitudinally disposed cross ties 18 and 19. The lower ends of the frame members 14 and 15 are welded to the tubular feet 20. Through the projecting lugs 21 extend the hook bolts 22 which engage the under edge 23 of the frame 10.

Between the horizontal cross ties 16 is disposed a platform 24 upon which is secured an operating motor 25 whose variable speed pulley 26 is connected by a belt 27 to the variable speed pulley 28 which drives the variable speed mechanism contained within the casing 29. A cover 30 of the casing 29 forms the journal for the shaft 31. On the shaft 31 is a power-take-off sprocket wheel 32. Motor pulley 26 is of a conventional type of split construction having a pulley face on one side of its belt groove slidable axially on the motor shaft to cause the belt 27 to ride lower or higher in the groove. Control knob 33 is fixed on a rotatable rod having a threaded portion carrying a nut connected with a conventional shifting fork and ring (not shown) on the movable pulley face for moving the pulley face to increase or decrease the effective diameter of the pulley in a well-known manner when the knob is turned. Pulley 28 is similarly constructed, having a movable pulley face spring pressed axially to increase its effective diameter and take up any slack in the belt when the effective diameter of pulley 26 is decreased. When the effective diameter of pulley 26 is increased, the split pulley 28 spreads farther apart against the spring tension to compensate.

On the cross ties 34 are mounted the bearings 35 in which journals a shaft 36 on which is secured a sprocket wheel 37 connected by a chain 38 to the sprocket wheel 32. On each end of the shaft 36 is a crank arm 39, each of which is provided with a counter-balance 40. Each crank arm 39 is provided with a crank pin 41 which is joined by a connecting rod 42 to the trunnion 43.

In Fig. 6 is illustrated the carrier 44, on each end of which is disposed a vertical slide 45 from which projects the trunnion 43. Depending from the carrier 44 are the plates 46 between which is clamped a cutter blade 47 which is secured by means of the bolts 48 passing through the plates 46 and blade 47.

On the shaft 36, on the inner side of each arm 39, is a cam 49. On a pivot bolt 50 in each cross tie 19 is mounted a forked lever 51 on whose single arm 52 is mounted a roller 53 which engages the cam 49 as it revolves about the axis of the shaft 36. The arm 52 is urged toward the shaft 36 by means of a spring 54 which is adjustably secured to the bracket 55 on the cross ties 17 by an eye bolt 56. The forked ends 57 of each lever 51 form a guide for the slide 45.

The purpose of this structure is to permit the blade 47 to descend vertically to the dough strip 13 and, as it continues to descend, it moves with the strip 13, as shown in Fig. 5. In other words, the blade 47 must get out of the way of the travelling dough strip or it will pile up behind the blade and cause trouble as well as an irregular cutting action.

It is desirable to provide a lamp 58 under the platform 24 so that it can illuminate the space directly around the cutting zone.

In Fig. 1 there is shown a casing 59 whose main purpose is to shield the apparatus from dust carried by the air and also to be better able to control the temperature of the cutter blade.

The operation of the device is as follows: Assuming that a dough strip 13 has been formed to the desired shape and consistency and it is desired to cut this strip into short lengths for baking, and that the various pieces shall be of uniform weight, the operator sets his knob 33 for the required speed and operates the motor 25 which causes the blade 47 to descend vertically toward the strip 13 and, by the time it reaches the strip, to be tilted by the cam 49, as shown in Fig. 5, wherein it will be seen that the action of the cam is sufficient to keep the blade 47 out of the way of the section of the oncoming strip of dough behind the severed dough block. The result of this mechanism is to enable the baker to produce an unlimited quantity of dough pieces of a predetermined weight without the necessity of continued inspection and supervision.

We claim:

A portable self-contained pastry cutting machine adapted for mounting above a pastry belt conveyor table comprising a frame having supporting legs to straddle the conveyor belt, feet on said legs for supporting said frame on said table on opposite sides of the belt, table clamps on said feet, a pair of vertical swinging arms pivotally mounted intermediate their ends on opposite sides of said frame, a cutter blade slidable vertically on the lower ends of said arms below said pivotal mounting, a crank shaft at the top of said frame, cranks on said crank shaft having connecting rods pivotally connected to said cutter blade for reciprocating said blade on said arms, cams on said crank shaft, rollers on the upper ends of said arms, springs connected between the upper ends of said arms and said frame holding said rollers against said cams, a platform in said frame above said cutter blade and beneath said crank shaft, and variable speed drive means including a motor on said platform operatively connected with said crank shaft for swinging said arms and reciprocating said blade.

References Cited in the file of this patent

UNITED STATES PATENTS

| | | |
|---|---|---|
| 935,340 | Middlesworth | Sept. 28, 1909 |
| 1,172,520 | Green | Feb. 22, 1916 |
| 2,576,533 | Ott | Nov. 27, 1951 |
| 2,681,088 | Krupp et al. | June 15, 1954 |

FOREIGN PATENTS

| | | |
|---|---|---|
| 736,077 | Germany | June 7, 1943 |